United States Patent [19]

Whitney et al.

[11] Patent Number: 5,043,548

[45] Date of Patent: Aug. 27, 1991

[54] AXIAL FLOW LASER PLASMA SPRAYING

[75] Inventors: Eric J. Whitney, Cincinnati; Vanon D. Pratt, Hamilton; Wilbur D. Scheidt; William R. Young, both of Cincinnati, all of Ohio

[73] Assignee: General Electric Company, Cincinnati, Ohio

[21] Appl. No.: 307,713

[22] Filed: Feb. 8, 1989

[51] Int. Cl.[5] .............................................. B23K 9/00
[52] U.S. Cl. ......................... 219/121.47; 219/121.5; 219/121.48; 219/76.16; 427/34; 427/53.1
[58] Field of Search ............ 219/121.47, 76.15, 76.16, 219/121.84, 121.59, 121.85; 427/53.1, 34

[56] References Cited

U.S. PATENT DOCUMENTS

| 3,872,279 | 3/1975 | Fairbairn | 219/121.5 |
| 4,121,085 | 10/1978 | Diemer et al. | 219/121.6 |
| 4,724,299 | 2/1988 | Hammeke | 219/121 L |
| 4,804,815 | 2/1989 | Everett | 219/121.6 |

FOREIGN PATENT DOCUMENTS

| 56-77201 | 5/1981 | Japan . |
| 61-264168 | 5/1985 | Japan . |
| 6213562 | 7/1985 | Japan . |
| 0009869 | 1/1986 | Japan | 219/121.84 |

OTHER PUBLICATIONS

Tucker et al., "Laser Processed Composite Metal Cladding for Slurry Erosion Resistance", (Thin Solid Films, 1984, pp. 73-84).

Primary Examiner—Mark H. Paschall
Attorney, Agent, or Firm—Jerome C. Squillaro; Carmen Santa Maria

[57] ABSTRACT

A laser plasma spray apparatus for depositing a feed material onto a substrate includes a nozzle having a plasma confinement chamber into which a laser beam is focused, the focal point being at a distance sufficiently far from the substrate that the substrate is not melted. Finely divided feed material in a carrier gas flow is fed axially into the confinement chamber along the direction of the laser beam and melted in the plasma formed in the interaction of the laser beam, the feed material, and the gas at the focal point. The melted feed material is then directed to deposit onto the substrate, while the plasma energy is largely confined within the apparatus by the confinement chamber and a constriction in the flow path upstream of the confinement chamber.

6 Claims, 1 Drawing Sheet

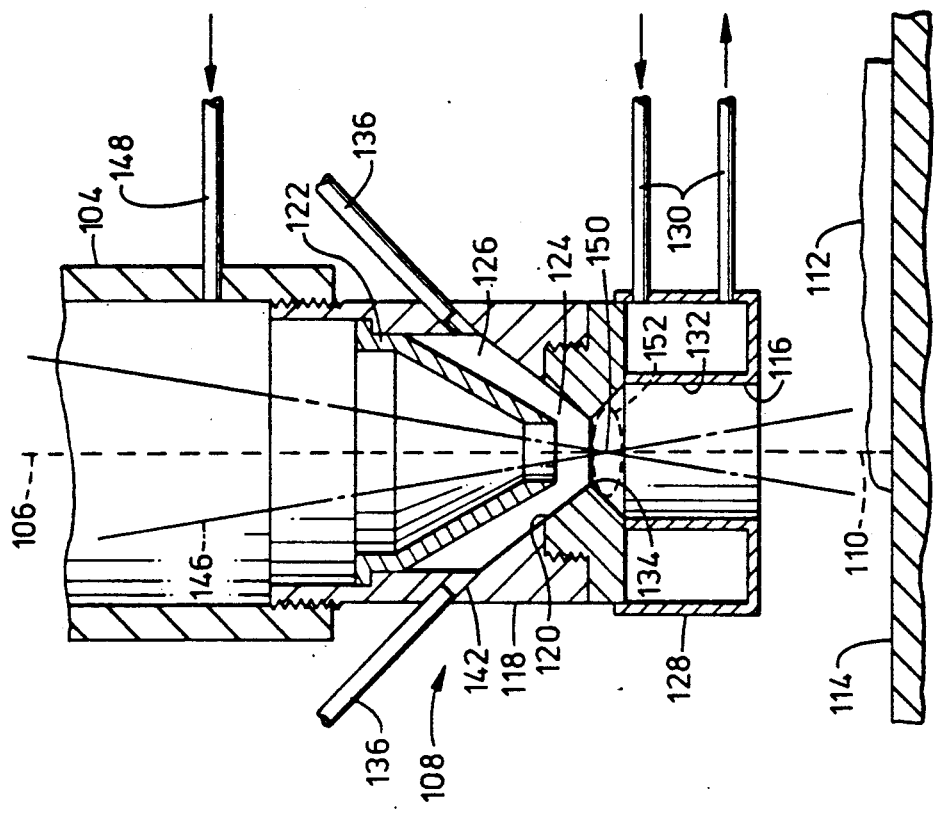
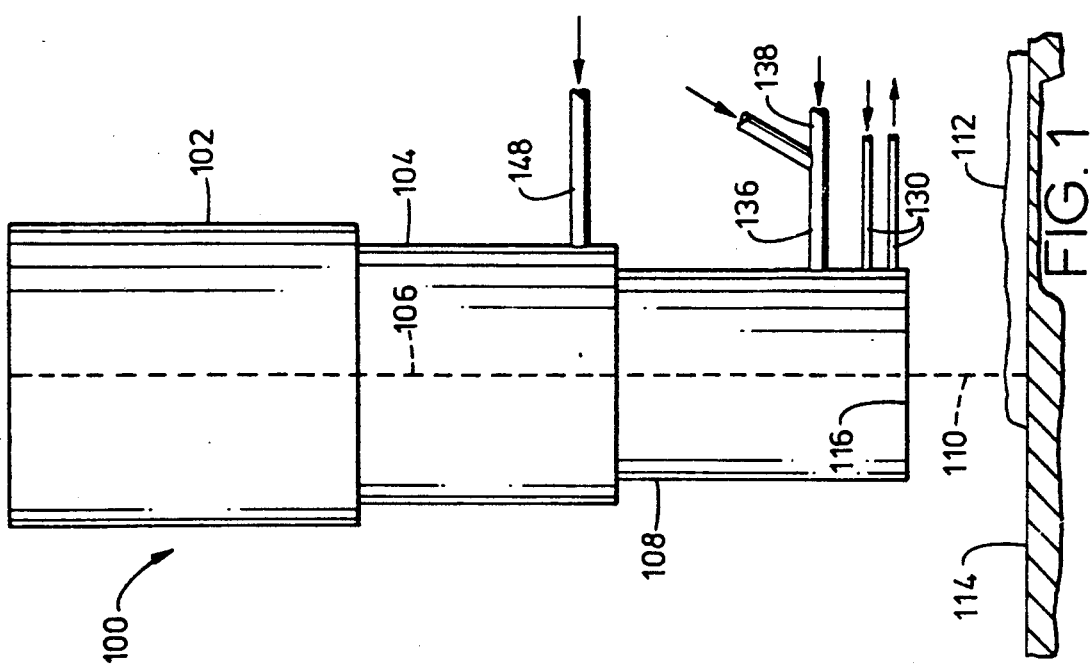

1

AXIAL FLOW LASER PLASMA SPRAYING

BACKGROUND OF THE INVENTION

This invention relates to the melting, vaporization and spraying of materials and, more particularly, to such spraying induced by laser heating.

In many modern materials systems, it is necessary to add layers of a material to an existing substrate. In some circumstances, a coating of a hard, wear resistant material is overlaid onto a strong, ductile material. The resulting composite provides a structural component that has good mechanical properties such as strength, ductility, and fracture toughness, and also has a surface that does not wear rapidly in environments that are erosive and/or corrosive. In another application, a part can be repaired by adding to the substrate new material of the same composition as the substrate, gradually building up a thickness of the added material to replace that which may have been lost during service. Many other applications of coating are in widespread use, because of the versatility afforded in designing custom materials systems.

The layers of the material may be added to the substrate in many different ways, depending upon the substrate, the added material, and the performance required. The added material may be provided in a bulk form and laminated, bonded, or affixed to the substrate. Alternatively, the material to be added can be provided in a form different from its final configuration and applied to the substrate atomically, often in either the molten or vaporous state. In many instances, the latter type of approach is preferred to produce an excellent bond of the added material to the substrate and to produce a highly controllable final product.

In one widely practiced approach, a plasma is formed with an electric arc. Metal powder in a gas stream is directed through the plasma, causing the metal to melt, at least in part. The melted metal is then sprayed against a substrate to solidify as a coating or built-up layer. Plasma spraying and other similar techniques are not practical for some metals, such as, for example, titanium alloys sprayed in an atmospheric environment. When done in a vacuum, the technique becomes expensive.

Alternative techniques based upon the use of a laser as an energy source have been proposed. For example, U.S. Pat. Nos. 4,200,669 and 4,724,299 whose disclosures are incorporated by reference, have provided procedures and apparatus said to be effective in melting powdered materials and depositing them upon the substrate. Experience has shown, however, that these approaches are inefficient in depositing feed material at a high rate onto the substrate. However, the basic viability of the laser heating source has been established.

There therefore is a need for an apparatus which utilizes a laser heating source for the plasma deposition of a finely divided feed material, and achieves high deposition rates and efficiencies. Such an apparatus should be controllable and versatile. The present invention fulfills this need, and further provides related advantages.

SUMMARY OF THE INVENTION

The present invention provides a laser plasma spray apparatus and process that permits high deposition rates and efficiencies of finely divided particles of a wide range of feed materials. The apparatus is controllable over a wide range of deposition rates, extent of heating of the substrate, and feedstocks. The size (width and thickness) of the deposited layer is controllable by adjusting such laser and operating parameters as nozzle height, powder feed rate, part traverse rate, gas flow rate, and nozzle configuration.

In accordance with the invention, laser plasma spray apparatus comprises a laser; an optical system configured to focus the beam of the laser to an interaction volume, the focal point of the laser being above the surface of the substrate such that the beam is diverging when it strikes the substrate; means for supplying a feed material and a flow of a gas to the interaction volume, wherein during operation a plasma is formed and at least a portion of the feed material is melted; and means for partially confining the plasma and the molten feed material and for directing the plasma and the molten feed material toward the substrate.

It has been found necessary to confine the plasma formed at the focal point of the laser beam in order to achieve high deposition rates and efficiencies. If the plasma is not confined, the plasma expands laterally outwardly and substantially reduces deposition efficiency and deposit density. Laser plasma spray differs from plasma (or key hole) welding in that the beam of the laser is sufficiently defocussed so that the substrate is not melted in laser plasma spray, while the surface regions of the substrate are melted by the laser beam in plasma welding. Plasma welding results in much greater heating and consequent melting of the substrate, with the feed material fed into the weld pool rather than being melted and then deposited upon an unmelted surface. In contrast, in laser plasma spraying the focal point of the laser and the central portion of the plasma are maintained at a sufficiently great distance from the surface of the substrate that the substrate is not melted. The focal point of the laser in the laser plasma spray apparatus is ordinarily maintained at a distance of at least 1-6 inches from the substrate, reducing the heating of the substrate and completely avoiding melting of the substrate.

In an embodiment utilizing a nozzle with a confinement chamber, laser plasma spray apparatus comprises a nozzle having a frustoconical outer housing, a frustoconical inner housing of smaller conical size than the outer housing and fitting therein with the frustoconical axes of the outer and inner housings coincident, the outer housing and the inner housing defining an annular passageway therebetween, and a hollow cylindrical extension of the outer housing having its cylindrical axis coincident with the frustoconical axes of the outer and inner housings, the cylindrical extension forming a plasma confinement chamber; a laser; an optical system configured to direct the beam of the laser along the frustoconical axis of the outer and inner housings to a focal point within the interior of the cylindrical extension; a gas supply system communicating with the interior of the inner housing, creating a flow of plasma-forming gas from the inner housing to the cylindrical extension; and a feed system communicating with the annular passageway between the inner housing and the outer housing and adapted for introducing thereto a flow of finely divided feed material mixed with a carrier gas.

In this embodiment, a fluidized stream of powder is introduced to the nozzle in the annulus between the inner and outer housings. A separate stream of gas along the axis of the housing sweeps the powder into the cylindrical extension confinement chamber, where the laser beam is focussed. The interaction of the gases, the powder, and the energy of the laser beam creates a plasma, which then becomes an independently radiating and self sustaining energy source. A portion of the powder is melted and contributes directly to the maintenance of the plasma, a portion of the powder is melted to form droplets, and another portion of the powder may intentionally or unintentionally remain unmelted. The confinement chamber and gas flows prevent the plasma and the melted feed material from expanding longitudinally or back toward the laser, so that the only direction of release is outwardly from the nozzle to the substrate. The continuing gas flow along the axis also aids in propelling the melted feed material toward the substrate.

As noted previously, this laser plasma spray approach should be clearly distinguished from laser welding, which occurs when the focal point of the laser beam is so close to the substrate and of such high power that the surface of the substrate melts. The focal point of the laser is external to the apparatus in laser welding, to directly heat and melt the substrate so that any feed material, if used, may be added directly to the weld pool. In laser plasma spraying, the primary heating source for melting the feed material is confined within the apparatus, as in conventional electric arc plasma spraying, and the melted metal is propelled toward the substrate. The substrate is not heated directly by the laser, except incidentally to the extent that some laser energy passes through, and is not absorbed by, the plasma, and therefore reaches the substrate in a greatly defocussed state having a low beam energy density. The plasma may extend out of the interior of the apparatus a distance under the force of the flowing plasma-forming gas, but is not sufficiently intense at the surface of the substrate to cause melting. Laser plasma spraying offers the highly significant advantage of being able to deposit the feed material on the substrate, without unduly affecting the metallurgical microstructure of the substrate.

More specifically in respect to the preferred embodiment, laser plasma spray apparatus comprises a laser configured to focus the beam of the laser to an interaction volume; a plasma confinement chamber within which the interaction volume is located, having a lateral confinement wall, a powder feed chamber between the laser and the confinement wall, and a throat of constricted size between the confinement wall and the powder feed chamber, through which the laser beam passes to reach the focal point of the laser; a powder supply system that provides powder feed material to the powder feed chamber in a carrier gas stream; and a gas supply system that moves the powder from the powder feed chamber to the confinement chamber in a plasma-forming gas stream.

In this embodiment, a throat between the confinement wall and the powder feed chamber assists in confining the plasma and distributing the powder as it is fed into the confinement chamber. Confinement against the plasma flowing back up into the apparatus is less dependent upon the magnitude of the gas flow, permitting more flexibility in control of the gas flows of the fluidizing gas and the axial flow gas.

The present invention also extends to a process for laser plasma spraying. In this aspect, a process for depositing a layer of a feed material onto a substrate comprises the steps of furnishing a laser having a focal point above the surface of the substrate, the focal point being sufficiently distant from the surface of the substrate that the substrate is not melted; forming a plasma in the region of the laser focal point; adding a finely divided feed material to the plasma to melt at least a portion of the feed material; and directing the molten feed material toward the substrate. Preferably, the process also includes the additional step of furnishing a confinement chamber around the focal point of the laser, the confinement chamber having a lateral wall with open ends that permits the laser beam to enter at one end and emerge from the other end.

The axial flow plasma spray apparatus of the invention provides an important advance in the art of deposition processes. A plasma is generated within the deposition apparatus to melt the feed material, so that the melted feed material is deposited upon a solid, unmelted substrate surface. The plasma is controllable, but is maintained at a distance whereat the substrate is not melted. Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 1 is an elevational view of the apparatus of the invention; and

FIG. 2 is a side sectional view of a portion of the deposition apparatus of FIG. 1.

DETAILED DESCRIPTION OF THE PREFERRED EMBODIMENT

The present invention is embodied in a laser plasma spray apparatus 100, illustrated generally in FIG. 1. The apparatus 100 includes a laser 102 having a beam that, when focussed by an optical system 104, is of sufficient power density to form a plasma and melt a feed of finely divided material. The beam of the laser 102, having a beam axis 106, is convergently focussed by the optical system 104, and then enters a spray nozzle 108, whose structure and operation are described in more detail below. In the nozzle 108, a plasma is formed and feed material is melted therein. The melted feed material is ejected as a spray 110 to form a deposit layer 112 on a substrate 114. The plasma is largely contained within the nozzle 108, and the surface of the substrate 114 is not melted. The operating distance from the tip of the nozzle 108 to the substrate 114 is typically about 1-6 inches. The spray 110 may be narrow and highly unidirectional, so that the bead 112 is approximately the width of an ejection opening 116 at the tip of the nozzle 108.

Referring to FIG. 2, the nozzle 108 includes an outer housing 118 which is threadably engaged to the end of the optical system 104, permitting the outer housing 118 to be adjustably moved toward and away from the laser 102. The external surface of the outer housing 118 is generally cylindrical in shape. The inner surface of the outer housing 118 includes a frustoconical surface 120 at the end thereof.

Disposed within the outer housing 118 and threadably engaged thereto is an inner housing 122. The housings 118 and 122 are both hollow, with the same central axis that coincides with the beam axis 106. The outer surface of the inner housing 122 includes a frustoconical surface 124 at the end thereof. The two frustoconical surfaces 120 and 124 are in a generally facing relationship to each other, defining an annular passageway 126 therebetween. Relative axial movement of the inner housing 122 and the outer housing 124 enlarges or reduces the area of the annular passageway 126.

Joined to the end of the outer housing 118 is a confinement chamber 128. The confinement chamber 128 is preferably cylindrical in shape, and is formed of a hollow wall construction so that cooling water may be circulated through the interior thereof by cooling water lines 130. The end of the confinement chamber 128 forms the ejection opening 116.

In one embodiment, the interior surface 132 of the confinement chamber 128 is cylindrical along its entire length, with the cylindrical axis coincident with the beam axis 106. More preferably, the interior surface 132 of the confinement chamber 128 is cylindrical along a portion of its length adjacent the ejection opening 116, but also includes a throat 134 of reduced section axially positioned between walls that slope outwardly away from the beam axis 106. The throat 134 is positioned adjacent the lower end of the frustoconical surface 120 of the outer housing 118.

Finely divided feed material, preferably in the form of powder, is introduced into the apparatus 100 through the annular passageway 126. The powder is initially contained in a powder supply source (not shown in the figures), and is fluidized into a carrier gas stream flowing in a carrier gas tube 136. The fluidized powder flows into a plurality of powder supply tubes 136, which typically comprises 2 to 4 tubes spaced equally around the circumference of the apparatus 100, and thence to injection ports 142 located symmetrically at the head of the annular passageway 126.

Another flow of gas is also provided to the nozzle 108. An axial gas flow of a plasma-forming gas is provided by an axial gas flow line 148 that communicates with the interior of the nozzle 108, either through the wall of the nozzle or through the wall of the optical system 104, in the illustrated embodiment. Plasma-forming gas flows from the line 148 through the interior of the nozzle 108, through the openings defined by the frustoconical surfaces 120 and 124, through the confinement chamber 128, and out the ejection opening 116. The axial gas flow protects the optical system from damage, assists in the formation of the plasma, and carries the melted material to the substrate.

The beam 146 of the laser 102 is focussed by the optical system 104 to a focal point 150 that is on the beam axis 106 and within the confinement chamber 128. The focal point 150 is sufficiently far from the surface of the substrate that the combination of direct heating and plasma heating are not sufficient to melt the surface of the substrate. In the illustrated embodiment having the throat 134, the focal point 150 is preferably within the outwardly sloping region below the throat 134. That is, the narrowest constriction of the throat 134 is between the focal point 150 and the laser 102.

Preferably the finely divided feed material forms an inverted cone as it exits from the throat 134. That feed material cone has a focal point which may be adjusted, i.e., the feed material focal point may be moved toward or away from the throat 134. Such adjustment of the feed material focal point is accomplished by rotation of the inner housing 122 relative to the outer housing 124. Such rotation moves the inner housing 122 axially and either enlarges or decreases the size of the annular passageway 126, particularly at its lower end. When the passageway 126 is made smaller in size, the feed material cone and its focal point are also changed. The feed material focal point and the laser beam focal point may be adjusted to coincide.

The power density of the beam 146 is greatest at the focal point 150. If the power density is sufficiently great at this location, the interaction between the axial gas, the carrier gas, the powder, and the energy of the laser beam results in the formation of a plasma 152. The plasma is a highly ionized cloud of ions and electrons that reaches an extremely high temperature within a limited volume. In this interaction volume, a portion of the atoms of the feed material in the powder are vaporized. The energy of the laser beam strips electrons from the plasma-forming gas atoms and the vaporized feed material atoms. The plasma, once initiated or "lit", becomes self sustaining if the flow of gas and the laser beam are maintained. A portion of the finely divided feed material is melted in the plasma, and other portions may intentionally or unintentionally remain unmelted. The continuing flow of plasma-forming gas through the region of the plasma formation and toward the substrate carries the melted and unmelted feed material to be ejected from the nozzle 108 through the opening 116, forming the spray 110 that deposits on the substrate 114 as the layer 112. The layer 112 therefore contains feed material that has been melted in the plasma and resolidified when it strikes the substrate, and possibly feed material that never was melted in the plasma. In some uses, such as the application of wear-resistant coatings, it may be desirable that a portion of the feed material remains unmelted. For example, the feed material may include finely divided ceramic powder, which, when deposited as particles on the surface of the substrate, increases wear resistance of the substrate.

An important feature of the laser plasma spray apparatus 10 is the partial confinement of the plasma 152 within the apparatus. The plasma 152 is confined laterally by the confinement chamber 128. It is confined against movement toward the laser 102, that is, back into the interior of the housings 118 and 122, by the flow of axial gas, carrier gas, and powder feed material. To provide such confinement, it has been found that the flows had to be quite high, reducing the operating range variations that were possible. In the preferred approach, establishment of the focal point 150 of the laser 102 (and thence the origin of the plasma) at a location within the throat 134 below the narrowest diameter of the throat has been found to aid significantly in confining the plasma and preventing it from expanding back into the interior of the housings 118 and 122.

As thus partially confined, the plasma 152 is free to expand in only one direction, down the confinement chamber 128 toward the substrate 114. Such expansion is observed in operation, and generally extends outwardly through the opening 116. The extent of the outward reach of the plasma depends primarily on the rate of gas flow through the confinement chamber 128 and the laser energy density at the laser focus 150. In any event, any plasma extending out of the nozzle does not heat the substrate sufficiently to melt it. If desired, the plasma may be intentionally reduced such that nearly all of the plasma is contained within the confinement chamber 128 with only a small expansion of plasma out of the opening 116. There is a considerable range of control of the plasma size and extent in the present apparatus.

The heating of the substrate is influenced by the plasma, with a plasma entirely contained within the apparatus 10 heating the substrate only by the relative small amount of radiation through the opening 116. The substrate is also heated by the energy released as the deposited atoms solidify and by the energy of the laser beam that is transmitted through the plasma and reaches the substrate in a defocussed state. These contributions to heating are relatively small, and it is found that deposition on the substrate is accomplished without melting the substrate or altering its metallurgical structure, for substrates having moderately high melting points. By contrast, where the focal point of the laser is outside the system, so that a plasma is formed close to or impinging upon the substrate, as in laser welding, the substrate is almost always melted and/or drastically changed in structure.

The following structural and operational details of an embodiment of the present approach are provided by way of additional information and not of limitation. In such embodiment, the confinement chamber has an inner diameter of 0.400 inch. The minimum throat diameter is 0.250 inch. The gap or dimension of the annular passageway is typically about 0.060 inches, but readily adjustable. The length of the nozzle is about 4 inches, but the dimension is not critical. The laser is a carbon dioxide laser operated at a power level of at least 2.5 kilowatts, in a continuous mode. A number of different gases and gas mixtures have been utilized for the axial plasma-forming gas flow, including argon, nitrogen, helium, hydrogen, oxygen, carbon dioxide, and mixtures thereof. Gases used for the powder carrier gas have included argon, nitrogen, helium, hydrogen, oxygen, carbon dioxide, and mixtures thereof. A variety of metallic and nonmetallic feed materials, and mixtures thereof, may be deposited, including ceramics, ceramic mixtures, and metal/ceramic mixtures. Such materials include titanium alloys such as Ti-6Al-4V, tungsten, cobalt alloys, nickel alloys such as Inconels and Hastelloy X, ceramics such as oxides of aluminum, chromium, and zirconium, and plastics.

Either the substrate or the nozzle, or both, is moved so that there is relative movement between the substrate and the nozzle. Preferably the nozzle is fixed and the substrate is automatically progressed under the substrate on an electro-mechanical table having X and Y axis of movement, the movement being under programmed computer control as to speed and direction of motion.

The following examples are presented to illustrate aspects of the invention, and should not be taken as limiting of the invention in any respect.

EXAMPLE 1

The illustrated apparatus was utilized to laser plasma spray Hastelloy X of powder size $-200/+400$ mesh onto a Hastelloy X substrate protected with an argon cover gas. The laser was operated at 3.4 kW (kilowatts) power, with a focal length of 7.5 inches. The total fluidizing and axial gas flow was 50 cubic feet per hour of argon gas, and the powder flow rate was 7 grams per minute. The nozzle was 1.5 inches above the substrate. The substrate was traversed past the nozzle at a rate of 640 inches per minute. The deposited layer had a width of about 0.10 inches and a height of about 0.001 inch. The bead was well bonded to the substrate. Some porosity and surface roughness was observed in the deposited layer when inspected metallographically.

EXAMPLE 2

Example 1 was repeated, except that the plasma gas was a mixture of equal parts of argon and nitrogen. The results were substantially the same, except that the deposit of Example 2 had a better surface quality.

EXAMPLE 3

Example 2 was repeated, except that the plasma gas was a mixture of argon and 5 percent by volume hydrogen, and the powder feed rate was 10.5 grams per minute. The results were similar to those of Example 2.

EXAMPLE 4

The illustrated apparatus was utilized to laser plasma spray Ti-6Al-4V of powder size $-100/+230$ mesh onto a Ti-6Al-4V substrate protected with an argon cover gas. The laser was operated at 5 kW power, with a focal length of 5.0 inches. The total fluidizing and axial flow was 40 cubic feet per hour of argon gas, and the powder flow rate was 10 grams per minute. The nozzle was 2 inches above the substrate. The substrate was traversed past the nozzle at a rate of 100 inches per minute. A layer was successfully deposited upon the substrate.

EXAMPLE 5

Example 4 was repeated, except that the cover gas was a mixture of argon and helium, with the argon flow 30 cubic feet per hour and the helium flow 5 cubic feet per hour. The nozzle height was 1 inch above the surface. Otherwise, the operating parameters and results were similar.

EXAMPLE 6

The illustrated apparatus was utilized to laser plasma spray tungsten of powder size $-200/+400$ mesh onto a copper substrate protected with an argon cover gas. The laser was operated at 5 kW power, with a focal length of 5.0 inches. The fluidizing and axial gas flows were a mixture of argon and nitrogen gases, with the argon flow rate being 30 cubic feet per hour and the nitrogen flow being 10 cubic feet per hour. The powder flow rate was 22 grams per minute. The nozzle was 1 inch above the substrate. The substrate was traversed past the nozzle at a rate of 40 inches per minute. A layer was successfully deposited upon the substrate.

EXAMPLE 7

The illustrated apparatus was utilized to laser plasma spray Inconel 718 nickel-based alloy of powder size $-200/+325$ mesh onto an Inconel 718 alloy substrate protected with an argon cover gas. The laser was operated at 3.5 kW power, with a focal length of 5.0 inches. The total fluidizing and axial gas flow was 40 cubic feet per hour of argon gas, and the powder flow rate was 6 grams per minute. The nozzle was 1 inch above the substrate. The substrate was traversed past the nozzle at a rate of 40 inches per minute. A layer was successfully deposited upon the substrate.

EXAMPLE 8

The illustrated apparatus was utilized to laser plasma spray a powdered mixture of 60% by weight silver and 40% by weight tungsten carbide, having a powder size of $-200/+400$ mesh, onto a copper substrate protected with an argon cover gas. The laser was operated at 4 kW power, with a focal length of 5.0 inches. The fluidizing and axial gas flows were a mixture of argon and hydrogen gases, with the argon flow rate being 30 cubic feet per hour and the nitrogen flow being 10 cubic feet per hour. The powder flow rate was 20 grams per minute. The nozzle was 1 inch above the substrate. The substrate was traversed past the nozzle at a rate of 40 inches per minute. A layer was successfully deposited upon the substrate.

EXAMPLE 9

The illustrated apparatus was utilized to laser plasma spray a powdered mixture of 70% by weight nickel alloy and 30% by weight aluminum oxide, having a powder size of −200/+400 mesh, onto an Inconel 718 substrate protected with an argon cover gas. The laser was operated at 4 kW power, with a focal length of 5.0 inches. The fluidizing and axial gas flows were a mixture of argon and nitrogen gases, with the argon flow rate being 30 cubic feet per hour and the nitrogen flow being 10 cubic feet per hour. The powder flow rate was 10 grams per minute. The nozzle was 1 inch above the substrate. The substrate was traversed past the nozzle at a rate of 100 inches per minute. A layer was successfully deposited upon the substrate.

EXAMPLE 10

The illustrated apparatus was utilized to laser plasma spray a powdered mixture of 92% by weight zirconium oxide and 8% by weight yttrium oxide, having a powder size of −200/+325 mesh, onto an Inconel 718 substrate protected with an argon cover gas. The laser was operated at 5 kW power, with a focal length of 5.0 inches. The fluidizing and axial gas flows were a mixture of argon and 2% by volume oxygen gases, with the total flow rate being 40 cubic feet per hour. The powder flow rate was 10 grams per minute. The nozzle was 2 inch above the substrate. The substrate was traversed past the nozzle at a rate of 100 inches per minute. A layer was successfully deposited upon the substrate.

These examples demonstrate that a wide variety of materials and mixtures may be successfully sprayed using the laser powder spray technique operated under various conditions. The present invention thus provides a highly versatile tool for depositing materials onto substrates. Although the present invention has been described in connection with specific examples and embodiments, it will be understood by those skilled in the arts involved that the present invention is capable of modification without departing from its spirit and scope as represented by the appended claims.

What is claimed is:

1. Laser plasma spray apparatus, comprising:
    a laser configured to focus the beam of said laser to an interaction volume;
    a plasma confinement chamber within which said interaction volume is located, having
    a lateral confinement wall,
    a powder feed chamber between said laser and said confinement wall, and
    a throat of constricted size between said confinement wall and said powder feed chamber through which the laser beam passes to reach the focal point of said laser;
    a powder supply system that provides powder feed material to said powder feed chamber in a stream of a carrier gas; and
    a gas supply system that moves the powder from said powder feed chamber to said confinement chamber in a stream of a plasma-forming gas.

2. The apparatus of claim 1, wherein said interaction volume is within said throat.

3. The apparatus of claim 1, wherein said powder supply system is adapted to receive carrier gas selected from the group consisting of argon, nitrogen, helium, hydrogen, oxygen, carbon dioxide, and mixtures thereof.

4. The apparatus of claim 1, wherein said gas supply system is adapted to receive plasma-forming gas selected from the group consisting of argon, nitrogen, helium, hydrogen, oxygen, carbon dioxide, and mixtures thereof.

5. The apparatus of claim 1, wherein said powder supply system is adapted to supply feed material selected from the group consisting of a titanium alloy, a nickel alloy, a cobalt alloy, and an iron alloy.

6. The apparatus of claim 1, wherein said powder supply system is adapted to supply powder feed material selected from the group consisting of a metal, a nonmetal, and a mixture of a metal and a nonmetal.

* * * * *